(12) United States Patent
Caprara et al.

(10) Patent No.: US 9,190,798 B2
(45) Date of Patent: Nov. 17, 2015

(54) OPTICAL PARAMETRIC OSCILLATOR WITH EMBEDDED RESONATOR

(71) Applicant: Coherent, Inc., Santa Clara, CA (US)

(72) Inventors: Andrea Caprara, Palo Alto, CA (US);
Luis A. Spinelli, Sunnyvale, CA (US);
Arnaud Lepert, Belmont, CA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 14/549,310

(22) Filed: Nov. 20, 2014

(65) Prior Publication Data

US 2015/0194780 A1 Jul. 9, 2015

Related U.S. Application Data

(60) Provisional application No. 61/927,385, filed on Jan. 14, 2014, provisional application No. 61/925,538, filed on Jan. 9, 2014.

(51) Int. Cl.
*G02F 1/39* (2006.01)
*H01S 3/00* (2006.01)

(52) U.S. Cl.
CPC ............. *H01S 3/0092* (2013.01); *G02F 1/39* (2013.01); *G02F 2001/392* (2013.01)

(58) Field of Classification Search
CPC .... G02F 1/39; G02F 2001/392; H01S 3/1083
USPC ........................................................ 359/330
See application file for complete search history.

(56) References Cited

U.S. PATENT DOCUMENTS

| 3,551,844 | A | * | 12/1970 | Smith ....................... 331/107 R |
| 3,869,210 | A | * | 3/1975 | Fletcher et al. ............... 356/459 |
| 5,768,302 | A | | 6/1998 | Wallace et al. |
| 5,991,318 | A | | 11/1999 | Caprara et al. |
| H2122 | H | * | 9/2005 | Schepler ......................... 372/22 |
| 6,940,880 | B2 | * | 9/2005 | Butterworth et al. ........... 372/22 |
| 6,980,354 | B1 | * | 12/2005 | Smith et al. ................... 359/330 |
| 7,130,321 | B2 | | 10/2006 | Spinelli et al. |
| 7,209,282 | B2 | * | 4/2007 | Kim et al. ..................... 359/328 |
| 7,254,153 | B2 | | 8/2007 | Butterworth et al. |
| 7,447,245 | B2 | | 11/2008 | Caprara et al. |
| 7,643,530 | B2 | | 1/2010 | Caprara et al. |
| 7,991,026 | B2 | | 8/2011 | Caprara |
| 8,243,765 | B2 | | 8/2012 | Caprara |
| 8,498,043 | B2 | * | 7/2013 | Esteban-Martin et al. ... 359/330 |
| 8,988,767 | B2 | * | 3/2015 | Foltynowicz et al. ........ 359/330 |

\* cited by examiner

*Primary Examiner* — Daniel Petkovsek
(74) *Attorney, Agent, or Firm* — Morrison & Foerster LLP

(57) ABSTRACT

An optical parametric oscillator includes one unidirectional enhancement resonator for optical pump-radiation and a second unidirectional resonator at least partially coaxial with the enhancement resonator. An optically nonlinear crystal is located in the coaxial portion of the resonators and converts the optical pump-radiation to signal radiation having a wavelength longer than that of the pump radiation and idler radiation having a wavelength longer than that of the signal radiation. The second resonator resonates the signal-wavelength radiation and delivers a fraction of that radiation as output radiation.

11 Claims, 4 Drawing Sheets

OPTICAL PARAMETRIC OSCILLATOR WITH EMBEDDED RESONATOR

PRIORITY INFORMATION

This application claims priority to Provisional Application Ser. No. 61/925,538, filed Jan. 9, 2014, as well as Provisional Application Ser. No. 61/927,385, filed Jan. 14, 2014, both of which are incorporated herein by reference.

TECHNICAL FIELD OF THE INVENTION

The present invention relates in general to optical parametric oscillators (OPOs). The invention relates in particular to continuous-wave (CW) OPOs providing output at the red (long) wavelength end of the visible electromagnetic spectrum (visible spectrum).

DISCUSSION OF BACKGROUND ART

Optical parametric oscillators are one class of laser apparatus that can provide continuously tunable laser output over a useful range of wavelengths. In an OPO an optically nonlinear crystal is arranged to divide the frequency of incident radiation into short and long wavelength portions. The incident radiation is typically referred to by practitioners of the art as pump radiation. The short and long wavelength portions of the frequency division are termed the signal and idler portions respectively. The sum of the signal frequency and the idler frequency is equal to the pump radiation frequency.

Typically it is the signal wavelength that is required for an application. The optically nonlinear crystal is located in an optical resonator arranged for circulating the signal wavelength radiation, providing optical parametric gain when pumped by the pump radiation. The idler radiation is allowed to escape the resonator. The signal and idler wavelengths can be tuned by varying the incidence angle of pump radiation in the optically nonlinear crystal or by varying the temperature of the optically nonlinear crystal.

Tunable CW laser-radiation in or near the red end of the visible spectrum is useful for applications in the biosciences. In order to provide signal radiation in that wavelength range, pump radiation must have a wavelength in the green or shorter wavelength region of the visible spectrum. Laser radiation at green or shorter wavelengths is typically generated by frequency-doubling near-infrared (NIR) radiation in or from a solid-state NIR laser such as neodymium-doped yttrium vanadate (Nd:YVO$_4$) or neodymium-doped yttrium aluminum garnet (Nd:YAG) laser. These lasers have a fundamental wavelength of about 1064 nanometers. Frequency-doubling provides second harmonic (2H) at a (green) wavelength of about 532 nm. Intra-cavity frequency-doubled optically pumped semiconductor (OPS) NIR lasers have more wavelength flexibility, and can provide green laser-radiation in wavelengths at or around the 532 nm wavelength.

The optical parametric generation process is relatively inefficient compared with harmonic conversion due to some of the parametrically converted radiation being at an unwanted (usually the idler) wavelength. Frequency doubling to provide green radiation, particularly of CW radiation is also a low efficiency process. Accordingly the overall optical-to-optical efficiency of a current state-of-the-art, green-radiation pumped CW OPO could be as low as a few percent. An improved architecture for a CW OPO laser, providing improved conversion efficiency, could expand the application of CW OPO lasers as sources of tunable laser-radiation.

SUMMARY OF THE INVENTION

In one aspect, optical apparatus in accordance with the present invention comprises a source of optical pump-radiation having a first wavelength. A first unidirectional ring resonator is provided and arranged to receive and resonate the optical pump radiation. A second unidirectional ring resonator is provided at least partially coaxial with the first unidirectional ring resonator. An optically nonlinear crystal is located in the coaxial portion of the first and second ring resonators and arranged for optical parametric conversion of the resonating optical pump radiation to second and third wavelengths, the second wavelength being longer than the first wavelength and the third wavelength being longer than the second wavelength. The second resonator is arranged to resonate the second wavelength radiation and deliver a fraction of the resonating second-wavelength radiation as output radiation.

In one preferred embodiment of the inventive apparatus the first and second resonators are formed from a common plurality of mirrors and are completely coaxial. In another preferred embodiment of the inventive apparatus the first resonator is formed from a first plurality of mirrors and the second resonator is formed from a second plurality of mirrors and is only partially coaxial with the first resonator.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
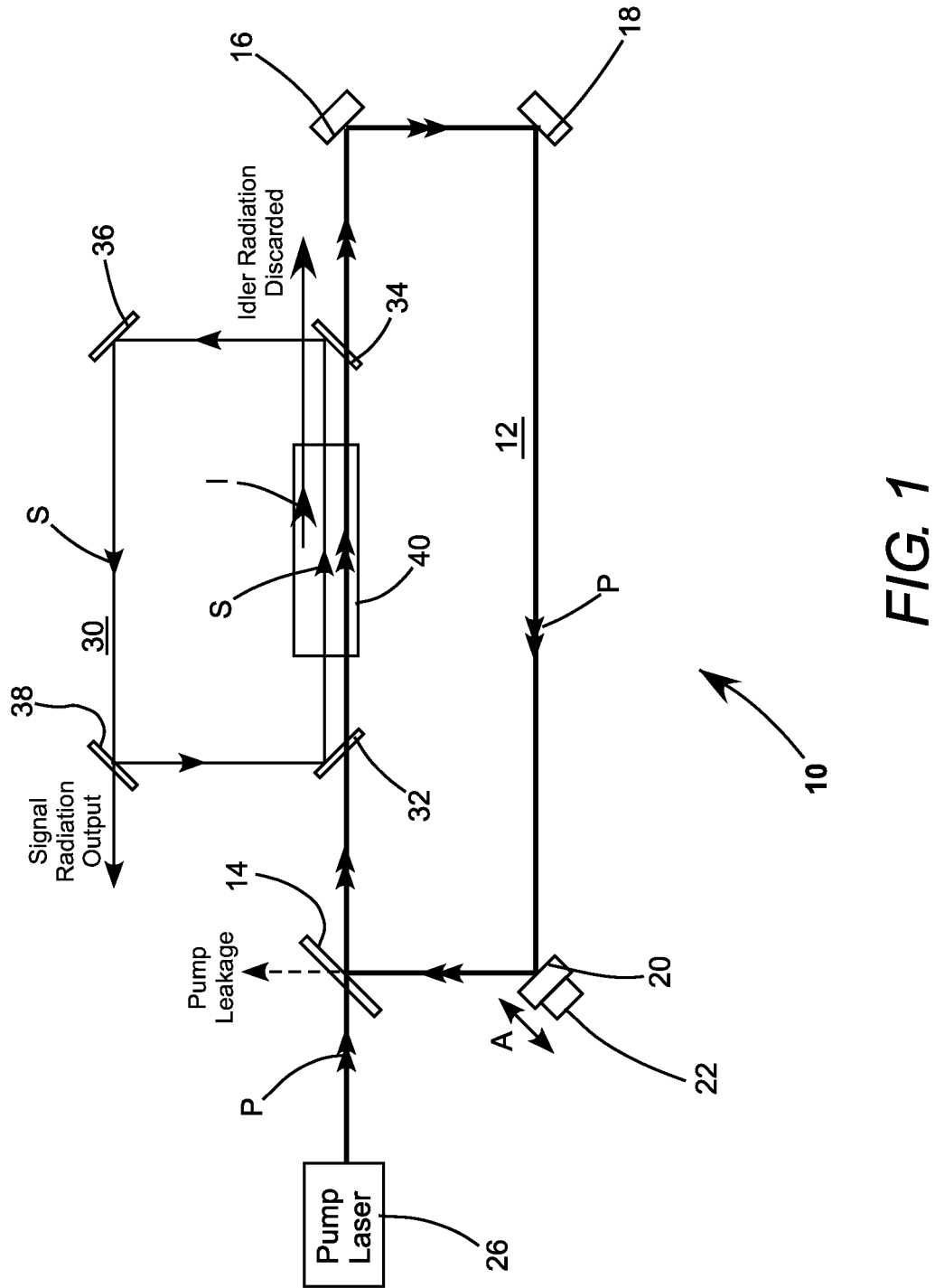
FIG. 1 schematically illustrates one preferred embodiment of an optical parametric oscillator apparatus in accordance with the present invention, including a first unidirectional ring resonator formed by a first plurality of mirrors and a second unidirectional ring resonator formed by a second plurality of mirrors and partially coaxial with the first resonator; an optically nonlinear crystal located in the coaxial portion of the resonator that converts pump radiation circulating in the first resonator to signal and idler radiations and the second resonator circulates the signal radiation and delivers a fraction thereof as output radiation.

Referring now to the drawings, wherein like components are designated by like reference numerals, FIG. 1 schematically illustrates a preferred embodiment of an optical parametric oscillator OPO apparatus 10 in accordance with the present invention. OPO 10 includes a first ring-resonator 12 formed by mirrors 14, 16, 18, and 20. Mirror 20 is mounted on an actuator 22 which can adjust the position of the mirror, as indicated by arrow A, for adjusting the optical length of the resonator.

A pump laser 26 supplies CW optical pump-radiation indicated by double arrowheads P. A preferred pump-laser is an intra-cavity frequency-doubled OPS-laser. Such a laser is commercially available form Coherent Inc. of Santa Clara Calif., the assignee of the present invention. The pump radiation is input into the resonator via mirror 14 which is partially reflective and partially transmissive at the pump-radiation wavelength. Mirrors 16, 18 and 20 are all maximally reflective for the pump-radiation wavelength. Circulation of pump radiation in resonator 12 is unidirectional as indicated by double arrowheads P. The circulation direction is established by the injection direction.

As noted above, mirror 20 is adjustable in position for adjusting the length of the resonator. The position of mirror 20 is actively adjusted to maintain resonator 12 in a resonant condition for the pump-radiation. Suitable adjustment schemes are well known in the art and include a frequency modulation based scheme usually referred to as the Pound-Drever scheme; and a polarization based scheme usually referred to as the Hänsch-Couillaud scheme. A detailed description of any such scheme is not necessary for understanding principles of the present invention, and, accordingly is not provided herein. There is some inevitable leakage of circulating pump radiation from mirror 14, which must be partially transparent to allow pump-radiation to be coupled into resonator 12.

A second ring-resonator 30 is formed by mirrors 32, 34, 36 and 38. Resonators 12 and 30 are coaxial between mirrors 32 and 34 of resonator 30. An optically nonlinear crystal 40 is located between mirrors in the coaxial portion of resonators 12 and 30 and converts the circulating (resonating) pump-radiation to signal-radiation (depicted by small single arrowheads S) and idler-radiation (depicted by a large single arrowhead I) by optical parametric conversion.

Mirrors 32 and 34 are highly transmissive for the pump-radiation and maximally reflective for the signal-radiation. Mirror 36 is maximally reflective for the signal-radiation. Mirror 38 is partially reflective and partially transmissive for the signal radiation. The signal radiation circulates (resonates) unidirectionally in resonator 30 with a fraction of the circulating signal radiation being delivered from resonator 30, via partially transmissive mirror 38, as output radiation. The circulation direction of the signal radiation is determined by the circulation direction of the pump radiation in resonator 12 and in crystal 40. Idler radiation is discarded, for example, through mirror 34.

Again, it should be noted that, in practice, the pump-radiation and signal radiation propagate coaxially between mirrors 34 and 36. The radiations are shown spaced-apart in FIG. 1 for convenience of illustration.

In calculating the performance of OPO 10 it was assumed that 12 Watts (W) of pump-radiation having a wavelength of 532 nm was input into resonator 12, with input mirror 14 having a transmission of 6% for the pump-radiation. Linear losses for resonator 12 and resonator 30 were assumed to be 0.5%. The resonators were assumed to be configured such that the beam radius for pump-radiation and signal-radiation in crystal 40 is 40 micrometers (μm). Mirror 38 of resonator 30 was assumed to be 4% transmissive for signal radiation. Crystal 40 was assumed to be a lithium borate (LBO) crystal having a length of 25.0 mm held at a temperature of 102.6° C. This provided a signal radiation wavelength of 784 nm and an idler-radiation wavelength of 1655 nm.

Given these assumptions it was calculated that the power of circulating 532 nm pump radiation in resonator 12 was 188.4 W. The power of circulating signal radiation in resonator 30 was 155.7 W providing a 784 nm signal radiation output of 6.23 W. Discarded 1655 nm idler-radiation power was 3.32 W.

Figure 2:
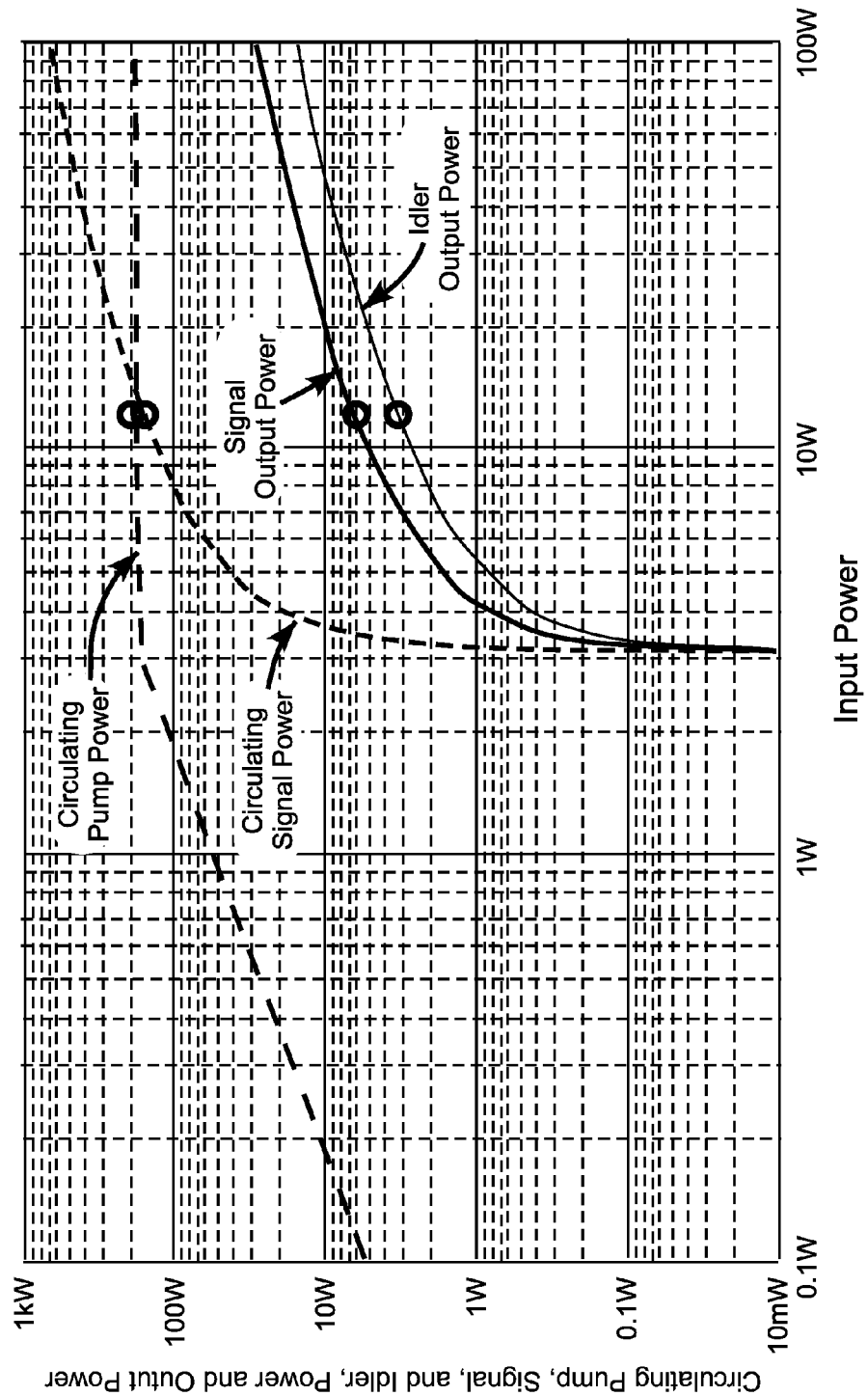
FIG. 2 is a graph schematically illustrating calculated power of circulating pump radiation, circulating signal radiation and output radiation in one example of the apparatus of FIG. 1.

A more general indication of the performance of OPO 10 is provided in FIG. 2 which is a graph schematically illustrating calculated power of circulating pump-radiation, circulating signal-radiation and output signal-radiation as a function of 532 nm input pump-power in the above discussed example of the apparatus of FIG. 1. The above discussed specific values for 12 W of pump-power input are indicated by circles on the appropriate curves.

Figure 3:
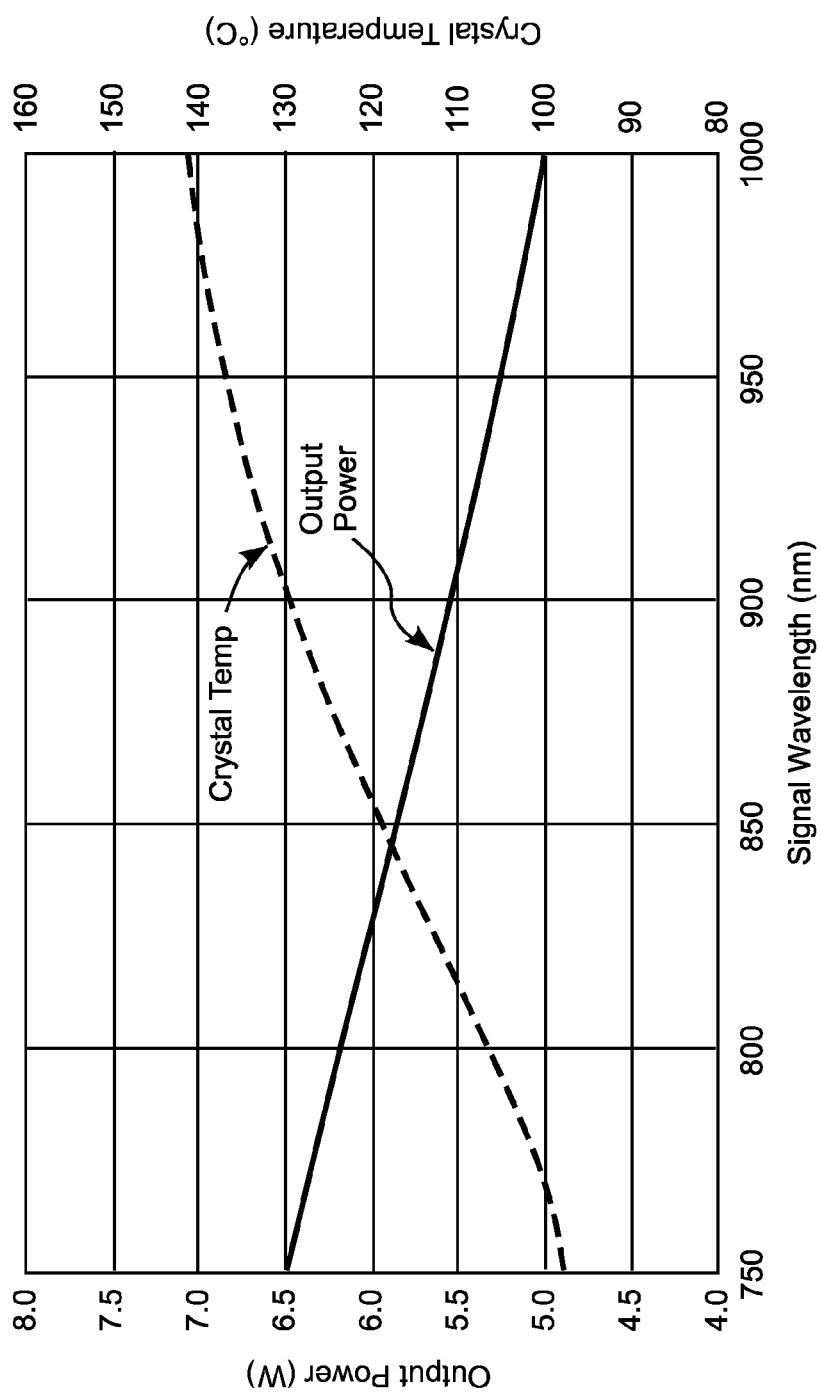
FIG. 3 is a graph schematically illustrating calculated output radiation power as a function of wavelength and optically nonlinear crystal temperature in the example of FIG. 2.

FIG. 3 is a graph schematically illustrating calculated signal-radiation output-power as a function of wavelength and optically nonlinear crystal temperature in the example of FIG. 2. This calculation indicates that output-radiation wavelength is temperature tunable to as low as 750 nm. It is estimated that the output radiation wavelength could be tuned to as low as 655 nm with a crystal temperature of 240° C. However the corresponding idler radiation having a wavelength of 2830 nm would be at least partially absorbed in an LBO crystal which could complicate temperature control arrangements.

Figure 4:
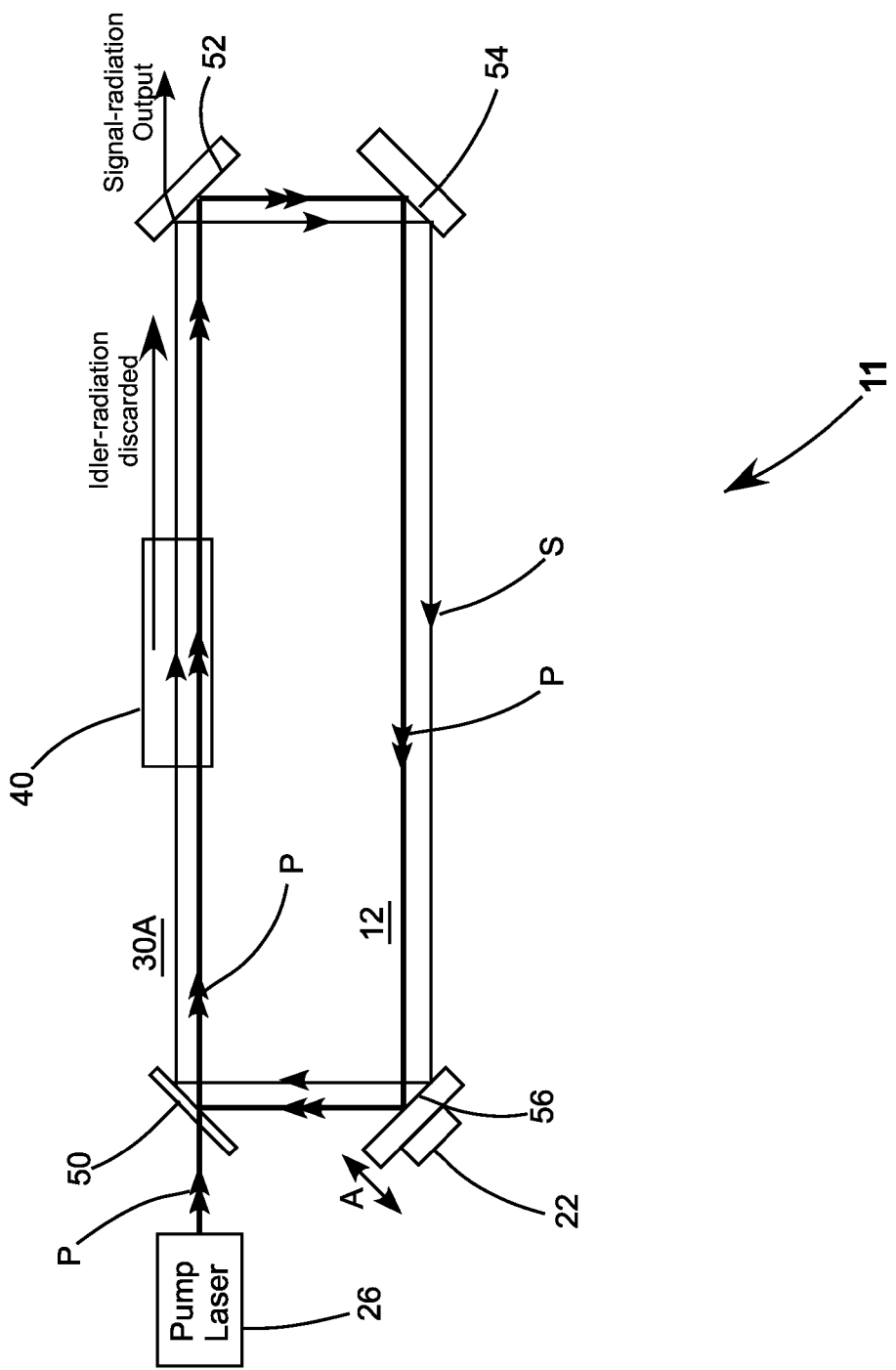
FIG. 4 schematically illustrates another preferred embodiment of optical parametric oscillator apparatus in accordance with the present invention similar to the apparatus of FIG. 1 but wherein the first and second resonators are formed from the same plurality of mirrors and are completely coaxial.

FIG. 4 schematically illustrates another preferred embodiment 11 of optical parametric oscillator apparatus in accordance with the present invention. Apparatus 11 is similar to apparatus 10 of FIG. 1 with an exception that the first and second resonators are formed from the same plurality of mirrors and are completely coaxial.

In FIG. 4 the mirrors are designated by reference numerals 50, 52, 54, and 56 to take into account that reflection and transmission specifications thereof are different from mirror 14, 16, 18 and 20 of apparatus 10 of FIG. 1. Resonator 30 is designated resonator 30A to take into account additional length and different mirrors of formation. The mirror specifications are as follows.

Mirror 50 is partially transmissive for the wavelength of pump-radiation, partially reflective for the wavelength of pump radiation, and maximally reflective for the wavelength of signal radiation. Mirror 52 is partially transmissive for the wavelength of signal-radiation, partially reflective for the wavelength of signal-radiation, and maximally reflective for the wavelength of pump-radiation. Mirrors 54 and 56 are maximally reflective for the wavelengths of signal-radiation and pump-radiation.

Clearly, one advantage of the embodiment of FIG. 4 over the embodiment of FIG. 1 is that there are less optical components in the embodiment of FIG. 1 than in the embodiment of FIG. 4. Offsetting this advantage are disadvantages as follows.

Mirror coatings for any of mirrors 50, 52, 54, and 56 would be more complicated and presumably more expensive than corresponding mirrors 14, 16, 18, and 20 of apparatus 10 of FIG. 1. A more significant disadvantage is that there cannot be any independent determination of pump-radiation beam diameter and signal-radiation beam-diameter in crystal 40. By way of example if the pump-radiation beam (532 nm) had the above-exemplified radius of 50 μm, the signal radiation beam would have a radius of about 60 μm. This would result in a conversion-efficiency for pump-radiation to signal-radiation about 30% less than would be achievable in the arrangement of FIG. 1.

In summary, the present invention is described above with reference to a preferred and other embodiments. The invention is not limited, however, to the embodiments described and depicted herein. Rather the invention is limited only to the claims appended hereto.

What is claimed is:

1. An optical parametric oscillator apparatus, comprising:
   a source of optical pump-radiation having a first wavelength;
   a first unidirectional ring resonator formed from a first plurality of mirrors and arranged to receive and resonate the optical pump radiation;
   a second unidirectional ring resonator formed from a second plurality of mirrors and being only partially coaxial with the first unidirectional ring resonator; and
   an optically nonlinear crystal located in the partially coaxial portion of the first and second unidirectional ring resonators and arranged for optical parametric conversion of the resonating optical pump radiation to second and third wavelengths, the second wavelength being longer than the first wavelength and the third wavelength being longer than the second wavelength and wherein the second unidirectional ring resonator is arranged to resonate the second wavelength radiation and deliver a fraction of the resonating second-wavelength radiation as output radiation.

2. The apparatus of claim 1, wherein the first wavelength is about 532 nanometers.

3. The apparatus of claim 2, wherein the second wavelength is about 784 nanometers and the third wavelength is about 1655 nanometers.

4. The apparatus of claim 1, wherein the optically nonlinear crystal is a lithium borate (LBO) crystal.

5. The apparatus of claim 1 wherein said source of optical pump radiation is a continuous wave laser.

6. An optical parametric oscillator apparatus, comprising:
   an intracavity frequency doubled optically pumpted semiconductor (OPS) laser delivering optical pump-radiation having a first wavelength;
   a first unidirectional ring resonator formed by a first plurality of mirrors and arranged to receive and resonate the optical pump radiation;
   a second unidirectional ring resonator formed by a second plurality of mirrors and being only partially coaxial with the first unidirectional ring resonator; and
   an optically nonlinear crystal located in the coaxial part of the first and second unidirectional ring resonators and arranged for optical parametric conversion of the resonating optical pump radiation to second and third wavelengths, the second wavelength being longer than the first wavelength and the third wavelength being longer than the second wavelength and wherein the second unidirectional ring resonator is arranged to resonate the second wavelength radiation and deliver a fraction of the resonating second-wavelength radiation as output radiation.

7. The apparatus of claim 6, wherein the first wavelength is about 532 nanometers.

8. The apparatus of claim 7, wherein the second wavelength is about 784 nanometers and the third wavelength is about 1655 nanometers.

9. The apparatus of claim 6, wherein the optically nonlinear crystal is a lithium borate (LBO) crystal.

10. The apparatus of claim 6 wherein the OPS laser generates a continuous wave output.

11. An optical parametric oscillator apparatus, comprising:
    a source of optical pump-radiation having a first wavelength;
    a first unidirectional ring resonator formed from a first plurality of mirrors and arranged to receive and resonate the optical pump radiation;
    a second unidirectional ring resonator formed from a second plurality of mirrors and being only partially coaxial with the first unidirectional ring resonator; and
    an optically nonlinear crystal located in the partially coaxial portion of the first and second unidirectional ring resonators and arranged for optical parametric conversion of the resonating optical pump radiation to second and third wavelengths, the second wavelength being longer than the first wavelength and the third wavelength being longer than the second wavelength and wherein the second unidirectional ring resonator is arranged to resonate one of said second or third wavelength radiation and deliver a fraction of the resonating wavelength radiation as output radiation.

* * * * *